United States Patent
Hoffman

(10) Patent No.: US 6,311,946 B1
(45) Date of Patent: Nov. 6, 2001

(54) SADDLEBAG SUPPORT FOR COMPUTER SPEAKERS

(76) Inventor: Ladd C. Hoffman, 9331 Blom Blvd., Shreveport, LA (US) 71118

( * ) Notice: Subject to any disclaimer, the term of this patent is extended or adjusted under 35 U.S.C. 154(b) by 0 days.

(21) Appl. No.: 09/457,432

(22) Filed: Dec. 7, 1999

Related U.S. Application Data

(60) Provisional application No. 60/111,414, filed on Dec. 8, 1998.

(51) Int. Cl.[7] ................................................... F16M 11/00
(52) U.S. Cl. ........................ 248/682; 248/690; 248/205.2; 248/918
(58) Field of Search ................................ 248/687, 682, 248/690, 918, 442.2, 683, 205.2, 102, 298.1; 361/683, 682

(56) References Cited

U.S. PATENT DOCUMENTS

| | | | |
|---|---|---|---|
| 4,759,963 | * 7/1988 | Uso, Jr. et al. | 428/100 |
| 5,125,612 | 6/1992 | McNeal | 248/442.2 |
| 5,190,258 | 3/1993 | Yu | 248/279 |
| 5,639,060 | 6/1997 | Spoonts | 248/683 |
| 5,666,263 | 9/1997 | Mundt | 361/683 |
| 5,683,070 | 11/1997 | Seed | 248/442.2 |
| 5,758,972 | * 6/1998 | Mack et al. | 383/11 |
| 5,769,374 | 6/1998 | Martin | 248/221.11 |
| 5,927,661 | * 7/1999 | Tinsley et al. | 248/102 |
| 5,947,434 | * 9/1999 | Kosmoski et al. | 248/298.1 |
| 6,015,132 | * 1/2000 | Belle | 248/683 |
| 6,100,942 | * 8/2000 | Hollenbaugh et al. | 348/836 |

* cited by examiner

*Primary Examiner*—Anita King
*Assistant Examiner*—Kimberly Wood
(74) *Attorney, Agent, or Firm*—John M Harrison

(57) ABSTRACT

A saddlebag support for supporting a pair of computer speakers on opposite sides of a computer monitor, above the monitor-supporting surface. In a preferred embodiment the saddlebag support is characterized by a flexible, generally Y-shaped, right speaker support having a pair of parallel monitor top engaging strips for resting on the top of the computer monitor and a similar, flexible, left speaker support having a pair of attachment strips for removable attachment to the respective monitor top engaging strips of the right speaker support. A right speaker support panel element of the right speaker extends from the monitor top engaging strips on the right side of the computer monitor and an elongated, right speaker mount strip extends from the right speaker support panel. A left speaker support panel of the left speaker support extends from the attachment strips on the left side of the computer monitor and a left speaker mount strip extends from the left speaker support panel. The left and right speaker mount strips are looped under and then over the respective computer speakers and removably attached to the respective speaker support panels, such that the left and right computer speakers are supported on the respective sides of the computer monitor, above the computer monitor-supporting surface.

17 Claims, 3 Drawing Sheets

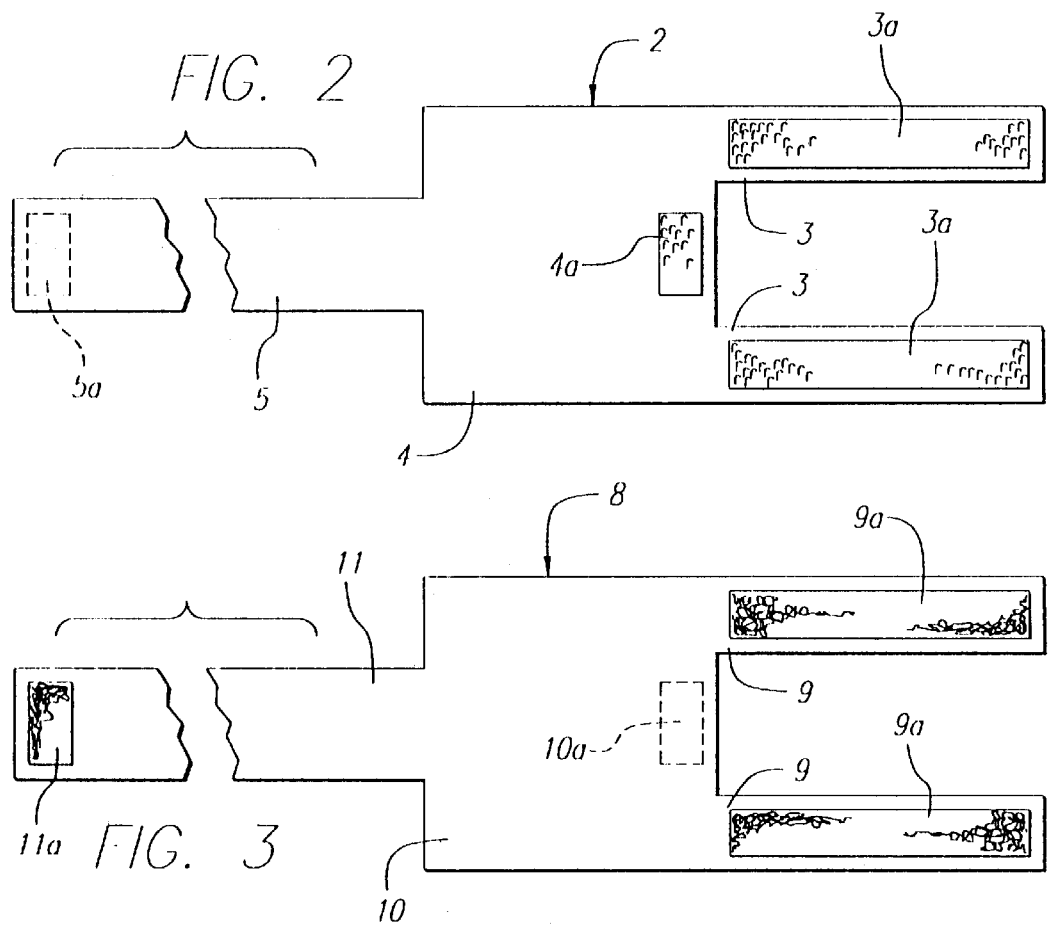
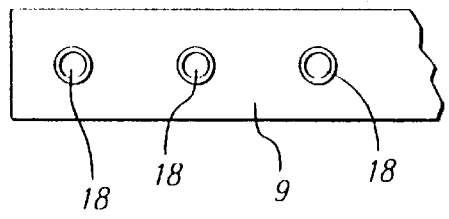
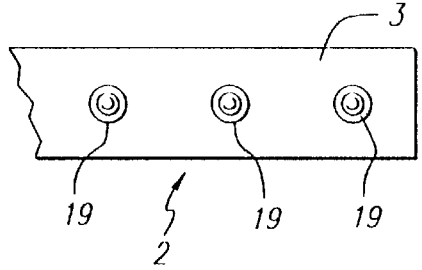
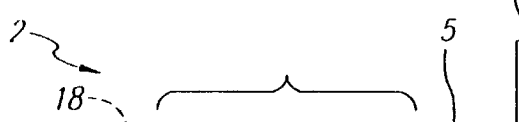
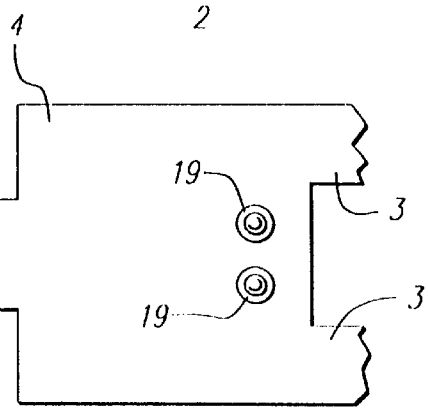

SADDLEBAG SUPPORT FOR COMPUTER SPEAKERS

CROSS-REFERENCE TO RELATED APPLICATIONS

This application claims the benefit of copending U.S. Provisional Application Ser. No. 60/111,414, filed Dec. 8, 1998.

BACKGROUND OF THE INVENTION

1. Field of the Invention

This invention relates to supports for computer speakers and more particularly, to a saddlebag support for supporting a pair of computer speakers on opposite sides of a computer monitor and above the computer monitor-supporting surface. In a preferred embodiment the saddlebag support includes a flexible, generally Y-shaped, right speaker support characterized by a pair of elongated, parallel monitor top engaging strips for resting on the top of the computer monitor. A right speaker support panel extends downwardly from the monitor top engaging strips on the right side of the computer monitor, and an elongated, right speaker mount strip extends from the bottom of the right speaker support panel and is provided on the extending end thereof, with a loop or pile element strip of a loop-pile fastener, which removably engages the companion pile or loop element strip, respectively, of the loop-pile fastener, provided on the right speaker support panel. A flexible left speaker support is similar in design to the right speaker support and includes a pair of attachment strips, each provided in a preferred embodiment with a loop or pile element strip of a loop-pile fastener for removably engaging companion pile or loop element strips, respectively, of the loop-pile fastener provided on the respective monitor top engaging strips of the right speaker support. A left speaker support panel of the left speaker support extends downwardly from the attachment strips on the left side of the computer monitor and a left speaker mount strip extends from the left speaker support panel and is provided with a loop or pile element strip of a loop-pile fastener for removable attachment to a companion pile or loop element strip, respectively, of the loop-pile fastener provided on the left speaker support panel. The right speaker mount strip of the right speaker support is looped under and then over the right computer speaker and removably fastened to the right speaker support panel, and the left speaker mount strip is similarly looped under and over the left computer speaker and removably fastened to the left speaker support panel, to suspend the right and left computer speakers, respectively, on opposite sides of the computer monitor, at a selected height above the computer monitor-supporting surface. In another embodiment the right and left speaker mount strips of the right and left speaker supports, respectively, are removably fastened to the respective speaker mount panels by means of snaps. In still another embodiment the attachment strips of the left speaker support are removably attached to the respective monitor top engaging strips of the right speaker support by means of snaps.

As the use of personal computers has increased, the use of various types of computer accessories such as audio speakers, has increased as well. A variety of computer speakers are available for use with personal computers. However, use of conventional computer speakers is frequently attended by one or more problems which hinders optimum use of the speakers with the computer. For example, most audio computer speakers are placed adjacent to the right and left sides, respectively, of the computer monitor on a table or other flat surface of the computer work station. Such placement of the speakers adjacent to the monitor tends to clutter the work area and can impair the computer operator's efficiency. Moreover, access to the speakers may be hindered by other equipment. Because the speakers are normally placed on the same table or surface which supports the monitor, they are usually located well below the level of the operator's head and thus tend to produce poor audio output. The sound quality may he further reduced because the speakers are often scattered about the work station and are not necessarily directed toward the computer operator.

2. Description of the Prior Art

Various brackets and other support devices are known in the art for supporting a computer speaker or other computer accessory on a computer monitor. Typical of these devices is the "Video Screen Bracket" detailed in U.S. Pat. No. 5,125,612, dated Jun. 30, 1992, to David R. McNeal. The bracket includes a pair of rings suspended from a bracket boom extending from the side of a computer monitor and worksheets are suspended from the rings to allow the computer operator to flip the worksheets over the bracket boom. U.S. Pat. No. 5,190,258, dated Mar. 2, 1993, to Chung C. Yu, discloses an "Articulated Support Assembly" for a computer audio amplifier housing. The assembly includes a first arm which can be pivoted from a retracted position in the housing to an angularly-extended position from the housing and a second arm which can be pivoted from a retracted position in the first arm to an angularly-extended position therefrom. An adjustable speaker mount at the extending end of the second arm pivotally receives a computer speaker and allows the speaker to be rotated and tilted at various selected positions on the speaker mount. U.S. Pat. No. 5,639,060, dated Jun. 17, 1997, to Sean K. Spoonts, et al, describes a "Mounting Bracket For Computer Speakers" for mounting an audio speaker to a computer, characterized by a mounting bracket having an upper section for engaging the upwardly-facing surface of a monitor. A generally vertical side section depends from the horizontal upper section for engaging a side surface of the monitor. A generally horizontal platform section extends outwardly from the side section for supporting an audio speaker thereon. The mounting bracket is secured typically by adhesive tape to the computer monitor. U.S. Pat. No. 5,666,263, dated Sep. 9, 1997, to Kevin W. Mundt, et al, discloses "Attaching A Speaker To A Computer Component", in which a coupling of selected design is configured to detachably secure a speaker to a computer component, by gravity. The coupling is characterized by a pocket provided on the computer which removably receives a flange provided on the speaker, or vertically-aligned projecting elements on the computer which are removably inserted in respective receptacles on the speaker. The speaker is attached to the computer by inserting the flange or projecting elements into the pocket or receptacles, respectively, and lowering the speaker to a position at which the speaker is secured to the computer. A "Means For Attaching Accessories To Video Display Terminal" is detailed in U.S. Pat. No. 5,683,070, dated Nov. 4, 1997, to Paul Seed. A channel is provided in the front and real edges ol the side and top segments of a rectangular frame which is fitted on the front face of the video display terminal. The computer accessory is fastened to a bracket provided with a pair of flanges which are inserted in the channels. An "Apparatus For Mounting A Computer Peripheral Device At Selectively Variable Locations On A Display Monitor" is detailed in U.S. Pat. No. 5,769,374, dated Jun. 23, 1998. The apparatus includes a mounting groove formed in the side and top portions of the monitor frame around the computer monitor screen. A spline projects from a computer peripheral device and is inserted in the groove and mounted at a selected location around the perimeter of the monitor frame, by inserting fastening members through the spline and into selected openings provided in the monitor frame.

An object of this invention is to provide a saddlebag support for supporting a pair of computer speakers on opposite sides of a computer monitor.

Another object of this invention is to provide a saddlebag support for suspending a pail of computer speakers on left and right sides of a computer monitor above the computer monitor-supporting surface.

Still another object of this invention is to provide saddlebag support elements, each of which removably engages the top and side surfaces of a computer monitor for suspending left and right computer speakers on left and right sides, respectively, of a computer monitor.

Yet another object of this invention is to provide a saddlebag support which can be used to suspend a pair of computer speakers on opposite sides of a standard or conventional computer monitor at a selected height above the monitor supporting surface and does not require modification of the speakers or computer monitor to achieve the purpose.

A still further object of this invention is to provide a pair of saddlebag support elements for computer speakers, each characterized by a flexible, generally Y-shaped, right speaker support, including a pair of monitor top engaging strips for resting on the top of a computer monitor, a right speaker support panel extending from the monitor top engaging strips on the right side of the monitor, an elongated, right speaker mount strip extending from the bottom of the right speaker support panel and a suitable fastener provided on the end of the right speaker mount strip for removably engaging the right speaker support panel. A similar flexible, left speaker support includes a pair of attachment strips for removable attachment to the respective monitor top engaging strips, a left speaker support panel extending downwardly from the attachment strips on the left side of the computer monitor, a left speaker mount strip extending from the bottom of the left speaker support panel and a suitable fastener provided on the end of the left speaker mount strip for removably engaging the left speaker support panel, wherein the right and left speaker mount strips on the right and left speaker supports, respectively, are extended beneath and over the right and left computer speakers, respectively, and fastened to the respective speaker support panels, to suspend the right and left speakers, respectively, on opposite sides of the computer monitor in saddlebag fashion, at a s elected height over the computer monitor-supporting surface.

SUMMARY OF THE INVENTION

These and other objects of the invention a re provided in a saddlebag support for suspending a pair of computer speakers on opposite sides of a computer monitor, above the computer monitor-supporting surface. In a preferred embodiment the saddlebag support includes a generally Y-shaped, flexible, right speaker support having a pair of elongated, parallel, monitor top engaging strips for resting on the top of the computer monitor, a right speaker support panel extending from the monitor top engaging strips on the right side of the computer monitor, an elongated, right speaker mount strip which extends from the bottom of the right speaker support panel and a loop or pile element strip of a loop-pile fastener or a pair of male or female snaps provided on the end of the right speaker mount strip for removable attachment to a companion pile or loop element strip, respectively, of the loop-pile fastener or a pair of female or male snaps, respectively, provided on the right speaker support panel. A flexible, left speaker support which is similar in design to the right speaker support, includes a pair of attachment strips or removable attachment to the respective monitor top engaging strips of the right speaker support, a left speaker support panel which extends downwardly from the attachment strips on the left side of the computer monitor, a left speaker mount strip which extends from the bottom of the left speaker support panel and a loop or pile element strip of a loop-pile fastener or a pair of male or female snaps provided on the end of the left speaker mount strip for removable attachment to a companion pie or loop element strip, respectively, of the loop-pile fastener or a pair of female or male snaps, respectively, provided on the left speaker support panel. The right computer speaker is secured on the right side of the computer monitor above the monitor-supporting surface by extending the right speaker mount strip of the right speaker support beneath and over the right computer speaker and removably fastening the right speaker mount strip to the right speaker support panel. The left computer speaker is likewise supported on the left side of the computer monitor above the monitor-supporting surface by extend the left speaker mount strip beneath and over the left computer speaker and removably fastening the left speaker mount strip to the left speaker support panel.

BRIEF DESCRIPTION OF THE DRAWINGS

The invention will be better understood by reference to the accompanying drawings, wherein:

FIG. 2 is a top view, partially in section, of the right speaker support component or element of a preferred embodiment of the saddlebag support for computer speakers, removed from over the computer monitor;

FIG. 3 is a bottom view, partially in section, of the left speaker support component or element of a preferred embodiment of the saddlebag support for computer speakers, removed from the computer monitor;

FIG. 4 is a bottom view, partially in section, of an attachment strip component of the left speaker support element of another embodiment of the saddlebag support for computer speakers, provided with male snaps for engaging corresponding female snaps provided on the right speaker support element to facilitate removable attachment of the left speaker support element to the right speaker support element;

FIG. 5 is a top view, partially in section, of a monitor top engaging strip component on the right speaker support component of the saddlebag support for computer speakers illustrated in FIG. 4, provided with female snaps for receiving male snaps provided on the left speaker support component to facilitate removable attachment of the left speaker support component to the right speaker support component;

FIG. 6 is a top view, partially in section, of the right speaker support component or element of another embodiment of the saddlebag support for computer speakers, provided with male and female snaps to facilitate fastening the right speaker mount strip to the right speaker support panel component of the right speaker support element or component, in attaching the right computer speaker to the right speaker support;

DESCRIPTION OF THE PREFERRED EMBODIMENTS

Figure 1:
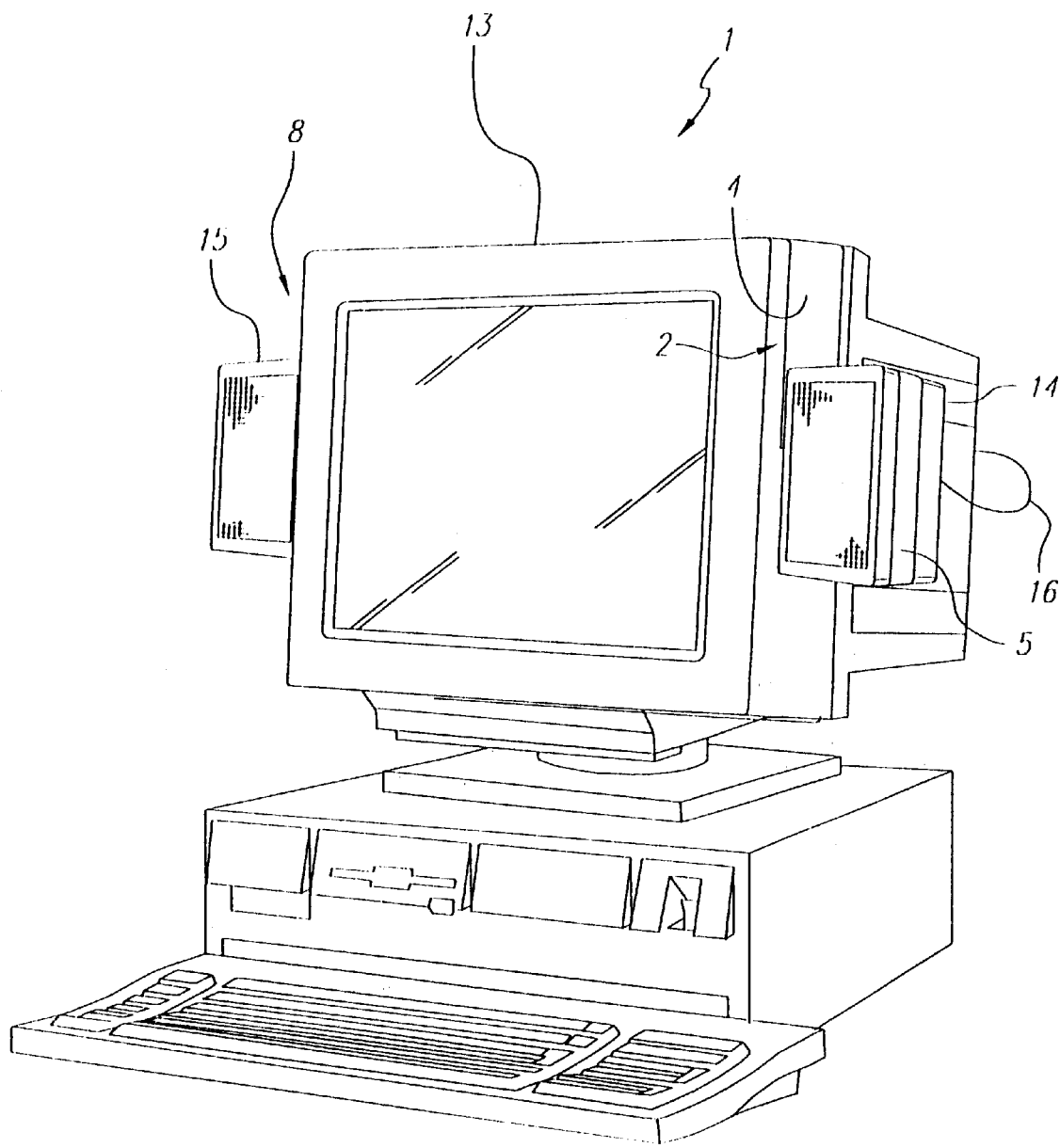
FIG. 1 is a perspective view of a computer monitor, with the saddlebag support for computer speakers of this invention mounted in functional, speaker-supporting configuration on the computer monitor.
Figure 7:
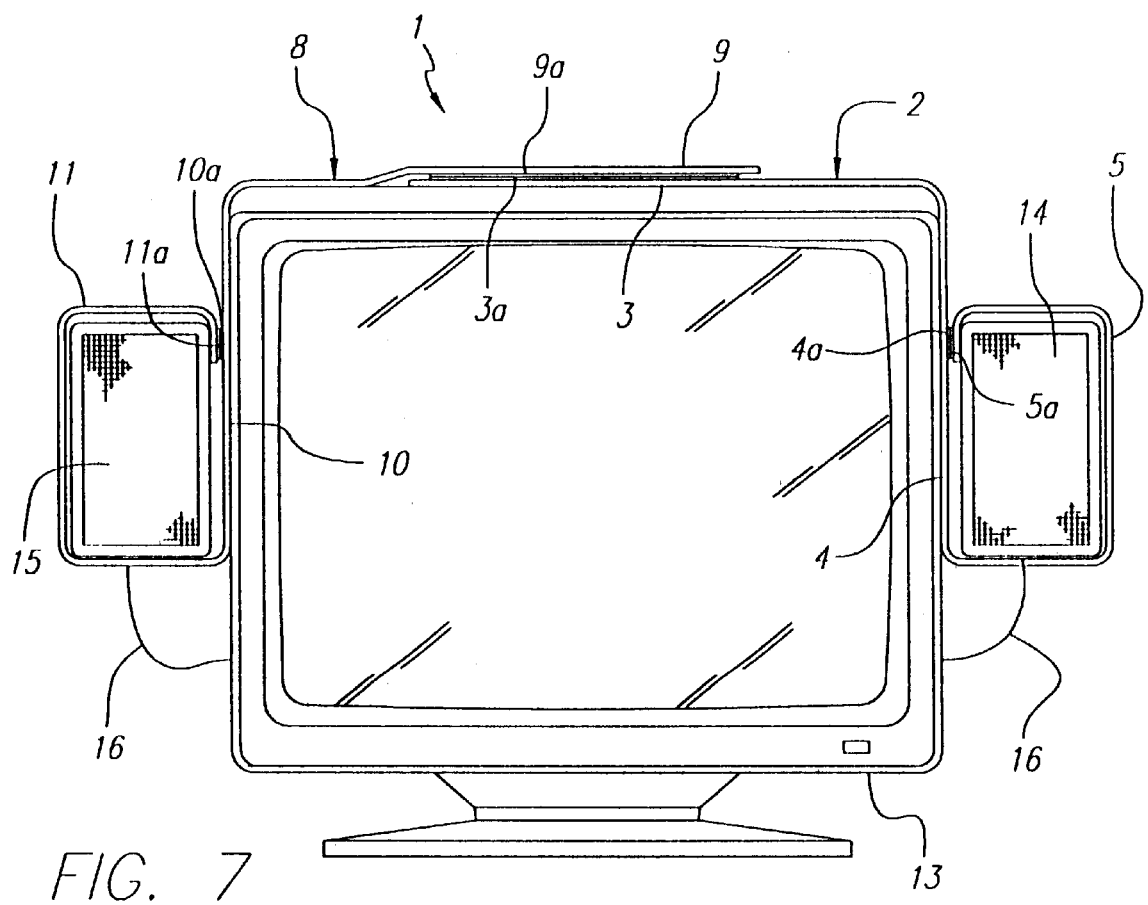
FIG. 7 is a front view of the computer monitor illustrated in FIG. 1, with the saddlebag support for computer speakers of this invention mounted in functional, speaker-supporting configuration on the computer monitor.

Referring initially to FIGS. 1–8 of the drawings, in a preferred embodiment the saddlebag support for computer speakers, hereinafter referred to as the saddlebag support, of this invention is generally illustrated by reference numeral 1. As illustrated in FIG. 1 the saddlebag support 1 includes a right speaker support 2, which supports a standard or conventional, right computer speaker 14 on the right side of a computer monitor 13, and a similar, left speaker support 8 (FIG. 7) which is removably fastened to the right speaker support 2 to define the saddlebag support 1, and supports a standard or conventional left computer speaker 15 on the left side of the computer monitor 13, above the computer monitor-supporting surface (not illustrated) at a selected height, as hereinafter further described. The right computer speaker 14 and left computer speaker 15 are typically wired to the computer monitor 13 by means of wiring 16, in conventional fashion. As illustrated in FIG. 2, the generally Y-shaped, right speaker support 2 is constructed from a flexible, resilient of on-slip material such as foam rubber, and includes pair of spaced, parallel monitor top engaging strips 3, which extend in spaced-apart, generally parallel relationship with respect to each other from a generally rectangular, right speaker support panel 4. An elongated, right speaker mount strip 5 extends from the opposite end of the right speaker support panel 4 from the monitor top engaging strips 3 and a pile element strip 5a (illustrated in phantom in FIG. 2) of a loop-pile fastener, typically provided on the bottom surface of the right speaker mount strip 5 adjacent to the extending end thereof, is caused to engage a companion loop element strip 4a of the loop-pile fastener provided on the top surface of the right speaker support panel 4, to secure the right computer speaker 14 in elevated configuration on the right side of the computer monitor 13, in typical application of the saddlebag supports 1 as illustrated in FIG. 7 and hereinafter further described. In an alternative embodiment illustrated in FIG. 6, a pair of male snap elements 18 (illustrated in phantom) typically provided on the bottom surface of the right speaker mount strip 5 is caused to removably engage a pair of female snap elements 19, respectively, provided on the upper surface of the right speaker support panel 4, to facilitate suspension of the right computer speaker 14 in the right speaker support 2. A loop element strip 3a of a loop-pile fastener is provided on the top surface of each monitor top engaging strip 3, as illustrated in FIG. 2, for engaging respective pile element strips 9a (FIG. 3), provided on a left speaker support 8 to facilitate removable attachment of the left speaker support 8 to the right speaker support 2, as further illustrated in FIG. 7 and hereinafter further described.

As illustrated in FIG. 3 the left speaker support 8, like the right speaker support 2, has a generally Y-shaped configuration and is constructed from a flexible, resilient non-slip material such as foam rubber. The left speaker support 8 includes a pair of spaced-apart, generally parallel attachment strips 9, which extend from a generally rectangular left speaker support panel 10. A pile element strip 9a of a loop-pile fastener is provided on the bottom surface of each attachment strip 9 for facilitating removable attachment of the left speaker support 8 to the right speaker support 2 by removable engagement with the respective loop element strips 3a of the loop-pile fastener provided on the monitor top engaging strips 3 of the right speaker supports 2. In an alternative embodiment of the saddlebag supports 1 illustrated in FIGS. 4 and 5, female snap elements 19, instead of the loop element strips 3a of the loop-pile fastener illustrated in FIG. 2, may be provided on the top surface of each monitor top engaging strip 3 of the right speaker support 2, to receive respective male snap elements 18, provided on the bottom surface of the corresponding, left speaker attachment strip 9 of the left speaker support 8, and facilitate removable attachment of the left speaker support 8 to the right speaker support 2. An elongated left speaker mount strip 11 extends from the left speaker support panel 10 and a pile element strip 11a of a loop-pile fastener is provided on the bottom surface of the left speaker mount strip 11 adjacent to the extending end thereof for removably engaging a loop element strip 10a of the loop-pile fastener (illustrated in phantom in FIG. 3), provided on the upper surface of the left speaker support panel 10, between the attachment strips 9, to secure the left computer speaker 15 on the left side of the computer monitor 13, in typical application of the saddlebag supports 1 as hereinafter further described. In another embodiment of the invention a pair of male snaps 18 are provided on the left speaker mount strip 11 for removable attachment to respective female snaps 19 provided on the left speaker support 10, as described above with respect to the right speaker support 2 illustrated in FIG. 6.

Figure 8:
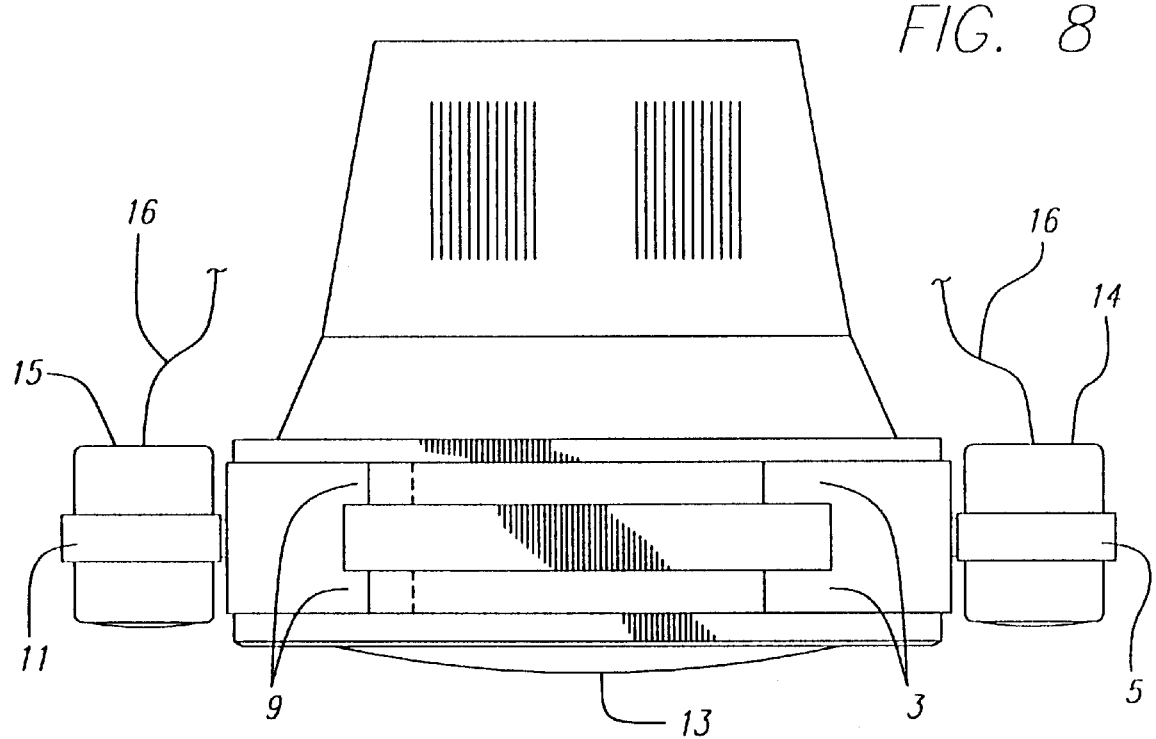
FIG. 8 is a top view of the computer monitor fitted with the mounted saddlebag support for computer speakers illustrated in FIG. 7.

Referring again to FIGS. 2–8 of the drawings, in typical application of the saddlebag support 1 the monitor top engaging strips 3 of the right speaker support 2 are initially placed on the top surface of the computer monitor 13, with the loop element strips 3a of the loop-pile fastener on the respective monitor top engaging strips 3 facing upwardly, as illustrated in FIG. 2, and the right speaker support panel 4 and right speaker mount strip 5 extending downwardly adjacent to the right side of the computer monitor 13. The attachment strips 9 of the left speaker support 8 are then removably fastened to the respective monitor top engaging strips 3 of the right speaker support 2 by removably engaging the pile element strips 9a of the loop-pile fastener (provided on the bottom surfaces of the respective attachment strips 9) with the respective loop element strips 3a of the loop-pile fastener (provided on the upper surfaces of the respective monitor top engaging strips 3). In the embodiment of the saddlebag support 1 illustrated in FIGS. 4 and 5, the male snaps 18 on the attachment strips 9 of the left speaker support 8 are typically removably inserted in the respective female snaps 19 provided on the monitor top engaging strips 3 of the right speaker support 2. When the left speaker support s is so attached to the right speaker support 2, the left speaker support panel 10 and extending left speaker mount strip 11 are downwardly-suspended adjacent to the left side of the computer monitor 13 and the right speaker support panel 4 and extending right speaker mount strip 5 of the right speaker support 2 are downwardly suspended adjacent to the right side of the computer monitor 13. As illustrated in FIGS. 7 and 8, the right speaker mount strip 5 of the right speaker support 2 is then extended beneath and then over the right computer speaker 14, and the pile element strip 5a of the loop-pile fastener (provided on the bottom surface of the right speaker mount strip 5) is caused to engage the loop element strip 4a of the loop-pile fastener (provided on the upper surface of the right speaker support panel 4), or the male snaps 18 (provided on the right speaker mount strip 5, FIG. 6) inserted in the respective female snaps 19 (provided on the right speaker support panel 4) to support the right computer speaker 14 on the right side of the computer monitor 13, as illustrated in FIG. 7. The left speaker mount strip 11 of the left speaker support 8 is then grasped to prevent the right speaker support 2 and attached left speaker support 8 from slipping off the top of the computer monitor 13 due to the weight exerted by the right computer speaker 14, and the left speaker mount strip 11 is then extended beneath and over the left computer speaker 15. The pile element strip 11a of the loop-pile fastener (provided on the bottom surface of the left speaker mount strip 11) is then caused to engage the loop element strip 10a of the loop pile fastener (provided on the upper surface of the left speaker support panel 10), or the male snaps (not illustrated) provided on the left speaker mount strip 11 are inserted in respective female snaps (also not illustrated) provided on the left speaker support panel 10 of the left speaker support 8 which accompanies the embodiment of the right speaker support 2 illustrated in FIG. 6, to secure the left computer speaker 15 on the left side of the computer monitor 13. It will be appreciated by those skilled in the art that when so mounted in the saddlebag support 1, the right computer speaker 14 and left computer speaker 15 are supported on respective sides of the computer monitor 13 in saddlebag fashion at a selected height above the computer monitor-supporting surface (not illustrated), and the weight of the right computer speaker 14 and left computer speaker 15 counterbalance each other to retain the saddlebag support 1 in functional, speaker-supporting configuration on the computer monitor 13. The right computer speaker 14 and left computer speaker 15 are removed from the mounted position in the corresponding right speaker support 2 and left speaker support 8, by disengaging the pile element strip 5a of the loop-pile fastener or male snaps 18 (FIG. 6) provided on the right speaker mount strip 5 of the right speaker support 2 from the loop clement strip 4a of the loop-pile fastener or female snaps 19, respectively, provided on the right speaker support panel 4, and disengaging the pile element strip 11a or male snaps (not illustrated) provided on the left speaker mount strip 11 of the left speaker support 8 from the loop element strip 10a of the loop-pile fastener or female snaps (not illustrated), respectively, provided on the left speaker support panel 10.

It will be appreciated by those skilled in the art that use of the saddlebag support 1 of this invention to suspend right and left computer speakers 14 and 15, respectively, on opposite sides of a computer monitor 13 requires no modification to either the left and right computer speakers 14 and 15, respectively, or the computer monitor 13. Moreover, it is understood that the pile element strips 9a on the left speaker support 8 can be provided on the monitor top engaging strips 3, and the loop element strips 3a provided on the right speaker support 2 can be secured to the left speaker attachment strips 9, in the same manner as described above. It will be further appreciated by those skilled hi the art that the length of the saddlebag support 1 can be varied according to the size of the computer monitor 13, by varying attachment of the pile element strips 9a on the attachment strips 9 of the left speaker support 8 along the length of the respective loop element strips 3a on the respective monitor-top engaging strips 3 of the right speaker support 2.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A saddlebag support for supporting a pair of computer speakers on a computer monitor, said saddlebag support comprising a pair of monitor top engaging strips for engaging the top of the computer monitor; a pair of attachment strips for removable attachment to said pair of monitor top engaging strips, respectively; a first speaker mount mechanism provided on said pair of monitor top engaging strips for receiving a first speaker on one side of the monitor; and a second speaker mount mechanism provided on said pair of attachment strips for receiving a second speaker on the other side of the monitor.

2. The saddlebag support of claim 1 wherein said first speaker mount mechanism comprises a speaker support panel provided on said pair of monitor top engaging strips, a speaker mount strip extending from said speaker support panel for receiving the first speaker and a fastening mechanism provided on said speaker support panel for receiving said speaker mount strip.

3. The saddlebag support of claim 2 wherein said second speaker mount mechanism comprises a second speaker support panel provided on said pair of attachment strips, a second speaker mount strip extending from said second speaker support panel for receiving the second speaker and a second fastening mechanism provided on said second speaker support panel for receiving said second speaker mount strip.

4. The saddlebag support of claim 2 wherein said fastening mechanism comprises a loop-pile fastener.

5. A saddlebag support for supporting a pair of computer speakers on a computer monitor, said saddlebag support comprising a monitor-engaging mechanism for engaging the top of the computer monitor; a first speaker support panel provided on said monitor-engaging mechanism, a first speaker mount strip extending from said first speaker support panel for receiving the first speaker and a loop-pile fastener provided on said first speaker support panel for receiving said speaker mount strip; a second speaker support panel provided on said monitor-engaging mechanism, a second speaker mount strip extending from said second speaker support panel for receiving the second speaker and a fastening mechanism provided on said second speaker support panel for receiving said second speaker mount strip.

6. The saddlebag support of claim 5 wherein said fastening mechanism comprises a second loop-pile fastener.

7. The saddlebag support of claim 6 wherein said monitor-engaging mechanism comprises a pair of monitor top engaging strips for engaging the monitor and a pair of attachment strips for removable attachment to said monitor top engaging strips, respectively, and wherein said first speaker support panel is provided on said monitor top engaging strips and said second speaker support panel is provided on said attachment strips.

8. The saddlebag support of claim 2 wherein said fastening mechanism comprises a set of snaps.

9. A saddlebag support for supporting a pair of computer speakers on a computer monitor, said saddlebag support comprising a monitor-engaging mechanism for engaging the top of the computer monitor; a first speaker support panel provided on said monitor-engaging mechanism for receiving a first speaker on one side of the monitor, a first speaker mount strip extending from said first speaker support panel for receiving the first speaker and a set of snaps provided on said first speaker support panel for receiving said first speaker mount strip; a second speaker support panel provided on said monitor-engaging mechanism, a second speaker mount strip extending from said second speaker support panel for receiving the second speaker and a second fastening mechanism provided on said second speaker support panel for receiving said second speaker mount strip.

10. The saddlebag support of claim 9 wherein said second fastening mechanism comprises a second set of snaps.

11. The saddlebag support of claim 10 wherein said monitor-engaging mechanism comprises a pair of monitor top engaging strips for engaging the monitor and a pair of attachment strips for removable attachment to said monitor top engaging strips, respectively, and wherein said first speaker support panel is provided on said monitor top engaging strips and said second speaker support panel is provided on said attachment strips.

12. A saddlebag support for supporting a pair of computer speakers on opposite sides of a computer monitor, said saddlebag support comprising a flexible, first speaker support, said first speaker support comprising a pair of monitor top engaging strips for engaging the monitor, a first speaker support panel provided on said monitor top engaging strips, a first speaker mount strip extending from said first speaker support panel for receiving the first speaker and a first fastening mechanism provided on said first speaker support panel for receiving said first speaker mount strip; and a flexible, second speaker support for removable attachment to said first speaker support, said second speaker support comprising a pair of attachment strips for removable attachment to said monitor top engaging strips, respectively, of said first speaker support; a loop-pile fastener provided on said monitor top engaging strips and said attachment strips, respectively, for removably attaching said attachment strips to said monitor top engaging strips, respectively; a second speaker support panel provided on said attachment strips, a second speaker mount strip extending from said second speaker support panel for receiving the second speaker and a second fastening mechanism provided on said second speaker support panel for receiving said second speaker mount strip.

13. The saddlebag support of claim 12 wherein said first fastening mechanism comprises a second loop-pile fastener.

14. The saddlebag support of claim 13 wherein said second fastening mechanism comprises a third loop-pile fastener.

15. The saddlebag support of claim 15 wherein said first fastening mechanism comprises a set of snaps.

16. The saddlebag support of claim 15 wherein said second fastening mechanism comprises a second set of snaps.

17. A saddlebag support for supporting a pair of computer speakers on left and right sides of a computer monitor, said saddlebag support comprising a flexible, first speaker support, said first speaker support comprising a pair of monitor top engaging strips for engaging the monitor; a first speaker support panel provided on said monitor top engaging strips, a first speaker mount strip extending from said first speaker support panel for receiving the first speaker, a pile element strip of a first loop-pile fastener provided on said first speaker mount strip and a loop element strip of said first loop-pile fastener provided on said first speaker support panel for receiving said pile element strip of said first loop-pile fastener; and a flexible, second speaker support for removable attachment to said first speaker support, said second speaker support comprising a pair of attachment strips for removable attachment to said monitor top engaging strips, respectively, of said first speaker support; a loop element strip of a second loop-pile fastener provided on said monitor top engaging strips, respectively, and a pile element strip of said second loop-pile fastener provided on said attachment strips, respectively, for removably engaging said loop element strips of said second loop-pile fastener, respectively; a second speaker support panel provided on said attachment strips, a second speaker mount strip extending from said second speaker support panel for receiving the second speaker, a pile element strip of a third loop-pile fastener provided on said second speaker mount strip and a loop element strip of said third loop-pile fastener provided on said second speaker support panel for receiving said pile element strip of said third loop-pile fastener.

* * * * *